Feb. 13, 1968           J. V. BALL           3,369,164

SECONDARY CELL REVERSAL PROTECTION DEVICE

Filed March 16, 1966

INVENTOR
JAMES V. BALL
BY
*Robert Levine*
ATTORNEY

United States Patent Office 3,369,164
Patented Feb. 13, 1968

3,369,164
SECONDARY CELL REVERSAL PROTECTION
DEVICE
James V. Ball, Lowell, Mass., assignor to P. R. Mallory & Co. Inc., Indianapolis, Ind., a corporation of Delaware
Filed Mar. 16, 1966, Ser. No. 534,832
10 Claims. (Cl. 320—6)

The present invention relates to means and methods for preventing reverse direction recharging of a discharged secondary cell. More particularly, the present invention relates to a magnetically activated reed switch for electrically shorting a discharged secondary cell so as to shunt substantially all of the discharge current of cooperatively associated secondary cells around the discharged cell. Shunting discharge current around the discharged cell prevents reverse direction recharging of the cell.

In a battery composed of a plurality of secondary cells coupled in electrical series, it is known that the individual cells differ each from the other in their individual capacity to store electrical energy although in theory each cell is like its serially coupled sister cell. As a result of this known capacity difference between the serially coupled cells, in operation some of the cells of the battery will be completely discharged before other cells.

Continued discharge of the sister secondary cells causes current to pass through the completely discharged cell in a direction reverse or opposite to the normal direction of the recharging current. The reverse direction flow of current causes the polarity of the completely discharged cell to be reversed. The polarity reversal of the cell not only reduces the output voltage of the cell but also causes gases to be evolved which cannot be reduced at the electrodes of the discharged cell. The gases accumulate and cause the internal pressure of the cell to increase until the means housing the cell ruptures destroying the cell and the battery.

The magnetically activated reed switch means of the present invention shorts the completely discharged cell and shunts the discharge current from the sister cells around the discharged cell. Shunting the discharge current of the sister cells around the completely discharged cell prevents the discharged cell from being reverse charged so as to prevent a deleterious gas buildup and/or prevents the reduction of the output voltage of the battery.

Therefore, it is an object of the present invention to provide a means and method of shorting the terminals of a secondary cell in a battery when the voltage of the cell attains a predetermined value.

Another object of the present invention is to provide a magnetically activated reed switch means for shorting the terminals of a secondary cell when the voltage of the cell approaches zero during a deep discharge of the cell.

A further object of the present invention is to provide a magnetically activated reed switch means for shunting discharge current around a deep discharged secondary cell that is reliable in operation and is economical to manufacture.

Yet another object of the present invention is to provide a magnetically activated reed switch means that requires a minimum amount of reset current to reset the reed members of the reed switch to a normally open position.

Yet still another object of the present invention is to provide a magnetically activated reed switch means for shunting discharge current around a deep discharged secondary cell that is characterized by its simplicity of construction.

Another object of the present invention is to provide a magnetically activated reed switch means for shunting discharge current around a deep discharged secondary cell, the switch means having a minimum number of parts.

A further object of the present invention is to provide a magnetically activated reed switch means for shunting discharge current around a deep discharged secondary cell, the switch means being efficient, effective and accurate.

Another object of the present invention is to provide a magnetically activated reed switch means for shunting discharge current around a deep discharged secondary cell, the switch means being easy to fabricate at low cost.

The present invention, in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawings. The invention resides in the novel construction, combination, arrangement, and cooperation of elements as hereinafter described and more particularly as defined in the appended claims.

The appended drawings illustrate an embodiment of the present invention constructed to function in the most advantageous modes devised for the practical application of the basic principles involved in the hereinafter described invention.

Generally speaking, the means and methods of the present invention relate to secondary cell reversal protection device. The reversal protection device is an integral part of a battery charging system. The reversal protection means provides a shunt path for the discharge current flow of the other cells around the discharged cell thereby preventing recharging of the discharged cell in a direction opposite to that of the direction of normal charge current flow. The reversal protection means includes a sealed envelope having reed members fixed in opposite extremities of the envelope. The reed members have normally disengaged free ends. A reset coil substantially surrounds the envelope and is coupled to a charging source. The reset coil develops a magnetic flux that retains the free ends of the reed members in a disengaged position during the charging of the secondary cell. A holding coil develops a magnetic flux that retains the reed members opened during the open circuit stand or discharge of the secondary cell. A permanent magnet means is positioned adjacent the holding coil and develops a magnetic flux for closing the reed members when the secondary cell voltage drops below a predetermined value thereby providing a shunt path around the discharged cell for the discharge current of the other serially coupled secondary cells of the battery.

Figure 1:
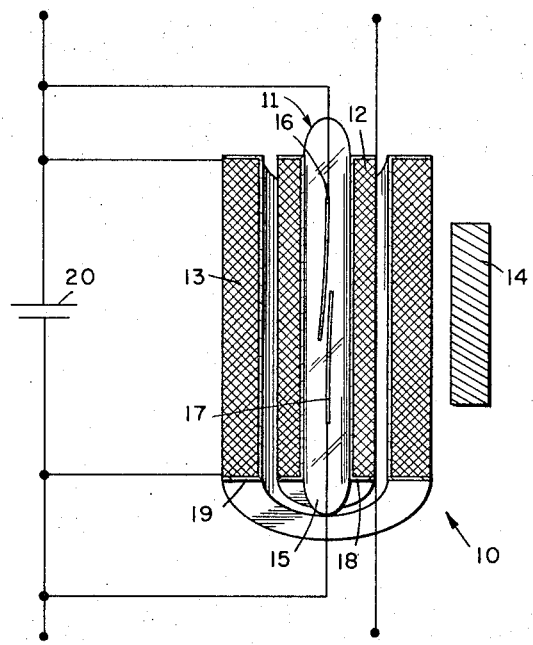
FIGURE 1 is a cross-sectional view of the reversal protection device, that is, the magnetically activated reed switch means, coupled across a secondary cell illustrating the several components thereof and the relative position of these components.

Referring now to FIGURE 1 of the drawings, the secondary cell reversal protection device is generally indicated by numeral 10. The reversal protection device comprises a magnetically activated, hermetically sealed reed switch 11 substantially surrounded by a first coil of wire hereinafter referred to as a reset coil 12. The reset coil is substantially surrounded by a coil of wire hereinafter referred to as a holding coil 13. A permanent magnet means 14 is positioned adjacent the holding coil.

The sealed reed switch consists of an envelope 15 fabricated from glass or the like. The envelope has two reed members 16 and 17 sealed in the opposite extremities thereof. It should be noted that the free ends of the reed members 16 and 17 are in the same plane such that the free ends of the reed members will engage each with the other upon the occurrence of a predetermined condition. The reeds may be fabricated from any suitable electrically conductive, resilient and magnetic metallic material such as an alloy of nickel-iron or the like. The envelope is vacuum pumped to remove air and is filled with an inert gas such as hydrogen or the like so as to provide the desired atmosphere in which the reed members can operate.

As illustrated in FIGURE 1, the glass envelope is substantially surrounded with the reset coil 12. The reset coil is coupled in series with a reset current source 70 by any suitable electrically conductive means. The reset current source may be connected to the reset coil by any suitable switching device 80 at the start of charge period. When reset current flows through the reset coil from the reset current source, the reset coil develops a magnetic flux of such magnitude and direction as to cause the reed members to be biased apart thereby preventing any electrical current from flowing therethrough, if any. The reset coil is substantially surrounded by any suitable electrically nonconductive means 18 such as plastic or the like.

The reset coil 12 is substantially surrounded by a holding coil 13. The holding coil is coupled across the secondary cell by any suitable electrically conductive means such as copper wire or the like. The holding coil has current flow therethrough from the secondary cell 20. The current flowing through the holding coil is of such value to cause a magnetic flux to be developed of sufficient magnitude and of such direction as to cause the free ends of the reeds to be disengaged and displaced each from the other. The holding coil is substantially surrounded by an electrically nonconductive means 19 such as plastic or the like.

The permanent magnet 14 is located adjacent the holding coil and has its major plane substantially parallel to the axis of the holding coil and the major plane of the reed members. The permanent magnet develops a magnetic flux of sufficient magnitude and direction as to cause the free ends of the reed members to engage each with the other if no current or a current below a predetermined value is flowing in either the holding coil or in the reset coil.

Figure 2:
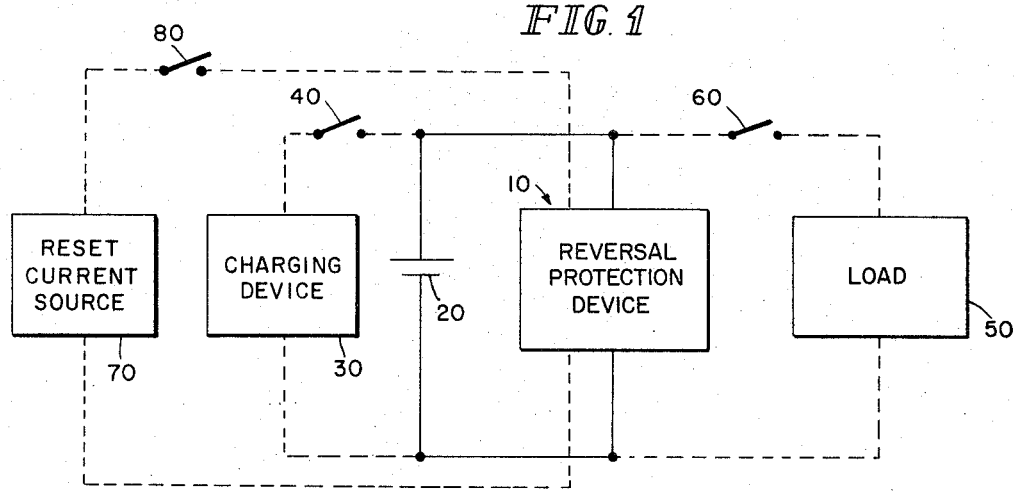
FIGURE 2 is an electrical schematic showing a charging device and load device coupled to the parallel combination of a secondary cell and the reversal protection device.

As shown by the dotted lines of FIGURE 2, the reversal protection device may be electrically coupled to any suitable charging device 30. Since the charging device may be of any suitable form, of which many may be conventionally used, the constructional details thereof have been omitted from the drawings in the interest of a clearer showing of the inventive portion of the reversal protection device. The charging device may be connected to and disconnected from the secondary cell 20 by any suitable means such as switch means 40. The charging device and reset current source may be combined into one unit.

Also coupled across the secondary cell as shown in dotted lines is a load means 50 such as, for example, an electrical appliance such as an electric shaver, radio, electric knife or the like. Since the load may be of any suitable form, details pertaining to the construction thereof have been omitted from the drawings in order to show more clearly the inventive portion of the present invention. The load may be connected to and disconnected from the load by means of the switch means 60.

With the hereinbefore structural disclosure in mind and by continued reference to the several figures of the drawing, the following analysis of the operation of the present invention will further serve to amplify the novelty of the present invention.

The principal operation of the reversal protection device can be understood by referring to FIGURE 1. Assuming that the secondary cell is fully charged, it will be noted that current flows from the cell through the holding coil and is of sufficient magnitude and direction as to cause the coil to develop a magnetic flux adequate to cause the free ends of the reed members to assume a disengaged or open position. It should be noted that the free ends of the reed members are normally disengaged or opened. The magnetic flux developed by the magnet is not sufficient to overcome the magnetic flux developed by the holding coil so as to cause the free ends of the normally open reed members to engage or close.

As the voltage of the secondary cell decreases during discharge, the current applied to holding coil drops. When the secondary cell reaches a predetermined discharged state, which may be completely discharged or any one of several values close thereto, the magnetic flux developed by the magnet is sufficient to overcome the magnetic flux developed by the holding coil, if any. As disclosed hereinbefore, the magnetic flux of the magnet is of such direction and magnitude as to cause the reed members to engage or close. The closed reed members provide a shunt path for discharge current flow around the completely discharged secondary cell. The flow of current from the serially coupled sister cells (not shown) is around, and not through the secondary cell. As disclosed hereinbefore, the flow of discharge current through the completely discharged secondary cell will recharge the cell in a direction reverse or opposite to the normal direction of charge. This causes the cell to evolve gas which increases the internal pressure of the cell which may cause the cell to rupture. In addition, the output voltage of the battery is reduced.

When the charging device is coupled across the completely discharged cell shorted by reed members, a charge current flows from the charging device through the reed members, preventing charge of the cell. The simultaneously applied flow of reset current through the reset coil is sufficient in magnitude and direction, however, to overcome the magnetic flux of the magnet and thereby cause the engaged ends of the reed members to disengage or open. The charging current then flows from the charging source through the secondary cell 20 in the proper direction. The charging current flowing into the cell reconstitutes the electrodes of the secondary cell. When the electrodes of the secondary cell are reconstituted, the secondary cell voltage rises. Current then flows through the holding coil thereby developing a magnetic flux that is of sufficient magnitude and direction to retain the free ends of the reed members in a disengaged or open position even after the magnetic flux of the reset coil has collapsed. The collapse of the magnetic flux of the reset coil is due to the cessation of reset current at the end of the charging period or at any time after the cell has reached sufficient voltage to energize the holding coil and prevent reed member closure.

As explained hereinbefore, when the individual cell voltage drops below the current required to maintain a magnetic flux of adequate magnitude to hold the free ends of the reed members in an open condition, the magnetic flux developed by the permanent magnet 14 causes the free ends of the reed members to engage or close. The engaged reed members provide a shunt path for the discharge current around the cell thereby preventing reverse charging of the discharged cell.

Although not shown, an individual reversal protection device as illustrated in FIGURE 1 of the drawings is coupled across each individual secondary cell of the battery. All reset coils in a battery may be connected in series and energized from one reset current source, since the reset coils are electrically isolated from the main charge and discharge circuit.

While the invention is illustrated and described in an embodiment, it will be understood that modifications and variations may be effected without departing from the scope of the novel concepts of this invention and as set forth in the appended claims.

Having thus described my invention, I claim:

1. Reversal protection means connected across each of the serially connected secondary cells of a battery comprising: a sealed envelope having reed members fixed in opposed extremities of said envelope and connected across said secondary cell, said reed members having normally disengaged free ends; a reset coil substantially surrounding said envelope and connected to a reset current source, said reset coil developing a magnetic flux for retaining said reed members disengaged during charging of said secondary cell; a holding coil substantially surrounding said reset coil and connected to said secondary cell, said holding coil developing a magnetic flux for retaining said reed members open during open circuit stand and discharge of said secondary cell; and a permanent magnet positioned adjacent said holding coil for developing a magnetic flux for closing said reed members when said secondary cell voltage drops below a predetermined value to thereby provide a shunt path for discharge current of said other serially coupled secondary cells of said battery.

2. The reversal protection means of claim 1 wherein said reed members are housed within a hermetically sealed envelope.

3. Reversal protection means coupled across each of the serially coupled secondary cells of a battery comprising: members having normally disengaged free ends and coupled across said secondary cell; a reset means coupled to a reset current source, said reset means retaining said members disengaged during charging of said secondary cell; a holding means coupled to said secondary cell, said holding means retaining said members open during discharge of said secondary cell; and means positioned adjacent said holding means for closing said free ends of said members when said secondary cell voltage drops below a predetermined value to thereby provide a shunt path for said discharge current of said other serially coupled secondary cells of said battery.

4. The reversal protection means of claim 3 including a sealed envelope and said members are fixed in opposite extremities of said envelope.

5. The reversal protection means of claim 4 wherein said members are reed members having normally disengaged free ends.

6. The reversal protection means of claim 3 wherein said reset means is a reset coil substantially surrounding said members and coupled to said reset current source, said reset coil developing a magnetic flux for retaining said members disengaged at the start of charging of said secondary cell.

7. The reversal protection means of claim 3 wherein said holding means is a holding coil substantially surrounding said reset means and coupled to said secondary cell, said holding coil developing a magnetic flux for retaining said members open during discharge of said secondary cell.

8. The reversal protection means of claim 3 wherein said means adjacent said holding means is a permanent magnet means for developing a magnetic flux for closing said free ends of said members when said secondary cell voltage drops below a predetermined value.

9. The reversal protection means of claim 8 wherein said members are reed members positioned opposite each other and each having a fixed end and a free end, said free ends normally disengaged.

10. The reversal protection means of claim 9, wherein said reed members are housed within a hermetically sealed envelope.

References Cited

UNITED STATES PATENTS 3,148,322    9/1964    Boor et al. _____ 320—43
3,293,529   12/1966    Fontaine _____ 320—15

JOHN F. COUCH, *Primary Examiner.*

S. WEINBERG, *Assistant Examiner.*